United States Patent
Takahashi

(10) Patent No.: US 10,828,987 B2
(45) Date of Patent: Nov. 10, 2020

(54) VEHICULAR DISPLAY DEVICE

(71) Applicant: Yazaki Corporation, Tokyo (JP)

(72) Inventor: Nobuyuki Takahashi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 136 days.

(21) Appl. No.: 16/280,178

(22) Filed: Feb. 20, 2019

(65) Prior Publication Data
US 2019/0255947 A1 Aug. 22, 2019

(30) Foreign Application Priority Data

Feb. 21, 2018 (JP) ................. 2018-028638

(51) Int. Cl.
| | | |
|---|---|---|
| *G02B 27/01* | (2006.01) | |
| *B60K 35/00* | (2006.01) | |
| *G02B 17/06* | (2006.01) | |
| *B60K 37/04* | (2006.01) | |

(52) U.S. Cl.
CPC .............. *B60K 35/00* (2013.01); *B60K 37/04* (2013.01); *G02B 17/0668* (2013.01); *G02B 27/0149* (2013.01); *G02B 2027/0161* (2013.01); *G02B 2027/0169* (2013.01)

(58) Field of Classification Search
CPC .. G02B 5/30; G02B 27/0101; G02B 17/0668; G02B 27/286; G02B 27/0149; G02B 2027/0123; G02B 2027/015; G02B 2027/0169; G02B 2027/0161; G02B 17/0621; G02B 2027/0196; G02B 17/0642

See application file for complete search history.

(56) References Cited

U.S. PATENT DOCUMENTS 10,473,927 B2 * 11/2019 Kuzuhara .............. G03B 21/62
2017/0052372 A1 2/2017 Takahashi

FOREIGN PATENT DOCUMENTS

JP 2016-000587 A 1/2016

* cited by examiner

*Primary Examiner* — Joseph P Martinez
(74) *Attorney, Agent, or Firm* — Sughrue Mion, PLLC

(57) ABSTRACT

A vehicular display device includes a display that emits, as display light, a display image projected onto a windshield, a transparent cover that blocks an opening of a housing and transmits at least a part of the display light emitted from the display, a plurality of reflecting mirrors, and a quarter wave plate. Using a vibration direction of the display light from the display as a reference vibration direction, the quarter wave plate converts the display light transmitted from the transparent cover toward the reflecting mirror into circularly polarized light vibrating in a direction tilted by 45 degree from the reference vibration direction and converts the circularly polarized light transmitted toward the reflecting mirror from the reflecting mirror into display light vibrating in a direction orthogonal to the reference vibration direction.

1 Claim, 1 Drawing Sheet

VEHICULAR DISPLAY DEVICE

CROSS-REFERENCE TO RELATED APPLICATION(S)

The present application claims priority to and incorporates by reference the entire contents of Japanese Patent Application No. 2018-028638 filed in Japan on Feb. 21, 2018.

BACKGROUND OF THE INVENTION

1. Field of the Invention

The present invention relates to a vehicular display device.

2. Description of the Related Art

According to the related art, some vehicles such as automobiles are equipped with a vehicular display device such as a head up display (HUD) device. The head up display device projects a display image displayed on a display onto a windshield or a combiner via a reflecting mirror or the like, and then a driver can visually recognize the display image as a virtual image (see, for example, Japanese Patent Application Laid-open No. 2016-000587). In the vehicular display device disclosed in Japanese Patent Application Laid-open No. 2016-000587, a display image-transmitting transparent cover is provided in an instrument panel opening portion, and the transparent cover blocks dust or the like from entering the inside of the device.

Nowadays, aspherical concave mirrors are used as reflecting mirrors in vehicular display devices for an increase in display image size. However, an increase in magnification based on an increase in reflecting mirror curvature is not without limitations. Although this can be dealt with by arrangement of a plurality of reflecting mirrors, an increase in the size of a housing accommodating the reflecting mirrors may arise in that case.

SUMMARY OF THE INVENTION

An object of the present invention is to provide a vehicular display device with which a display screen can be expanded and a housing can be reduced in size.

In order to achieve the above mentioned object, a vehicular display device according to one aspect of the present invention includes a display that emits, as display light, a display image projected onto a projected member provided in a vehicle; a cover member that blocks an opening provided in a housing and transmits the display light emitted from the display; a first aspherical mirror that is located at a position where an optical path of the display light from the display to the projected member is folded back, and reflects the display light; a quarter wave plate that is disposed at a position facing the first aspherical mirror on the optical path of the display light, transmits the display light incident from the cover member, and transmits the display light incident from the first aspherical mirror; and a second aspherical mirror that reflects the display light transmitted through the quarter wave plate toward the projected member disposed on an opposite side with respect to the cover member that is interposed between the second aspherical mirror and the projected member, wherein the display emits first linearly polarized light vibrating in a reference vibration direction, the quarter wave plate converts the first linearly polarized light incident from the cover member and transmitted to the first aspherical mirror side into circularly polarized light vibrating in a direction tilted by 45 degree with respect to the reference vibration direction, and converts the circularly polarized light reflected by the first aspherical mirror and transmitted toward the second aspherical mirror into second linearly polarized light vibrating in a direction orthogonal to the reference vibration direction, and the cover member has a convex curved surface shape protruding toward an inside of the housing, and has a structure to reflect the first linearly polarized light emitted from the display toward the quarter wave plate and transmit the second linearly polarized light from the second aspherical mirror toward the projected member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of a vehicular display device according to the present invention will be described in detail with reference to accompanying drawings. It should be noted that the present invention is not limited by the embodiment. In addition, constituent elements in the following embodiment include those that can be easily assumed by those skilled in the art or those that are substantially identical. In addition, various omissions, replacements, and changes can be made to the constituent elements in the following embodiment without departing from the gist of the invention.

Embodiment

Figure 1:
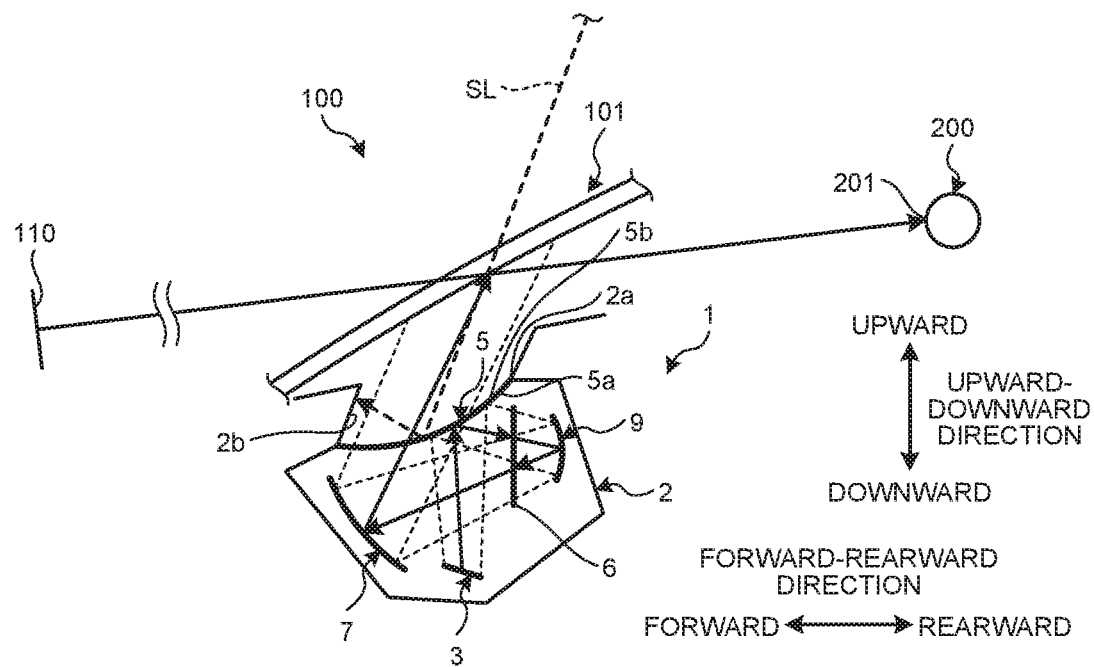
FIG. 1 is a schematic configuration diagram of a vehicular display device according to an embodiment.
Figure 2:
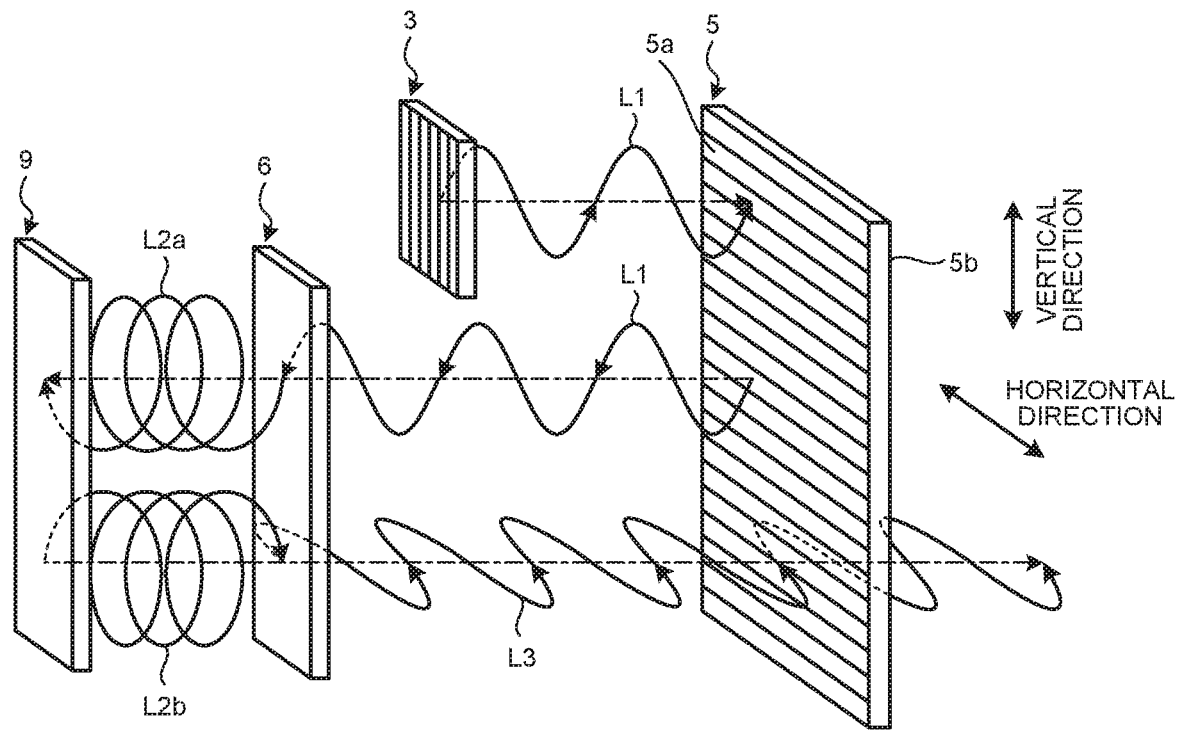
FIG. 2 is a schematic diagram illustrating a change in display light of the vehicular display device according to the embodiment.

A vehicular display device 1 according to the embodiment of the present invention will be described with reference to FIGS. 1 and 2. FIG. 1 is a schematic configuration diagram of the vehicular display device according to the embodiment. FIG. 2 is a schematic diagram illustrating a change in display light of the vehicular display device according to the embodiment. Incidentally, in FIG. 2, a part of the constituent members (reflecting mirror 7) is not illustrated so that the description can be simplified.

The vehicular display device 1 is a head up display device that is disposed inside an instrument panel (not illustrated) of a vehicle 100 such as an automobile and projects a display image onto a windshield 101. The vehicular display device 1 projects a display image onto the windshield 101 as a projected member and displays a virtual image 110 in front of an eye point 201 of a driver 200. The windshield 101, which has semi-transmissive properties, reflects a part of incident light and transmits the other part. Specifically, while transmitting the foreground of the vehicle 100, the windshield 101 reflects a display image projected from the vehicular display device 1 to the eye point 201 of the driver 200 as display light. The windshield 101 is disposed above the instrument panel of the vehicle 100. The eye point 201 is presumed as a viewpoint position of the driver 200 of the vehicle 100. The driver 200 recognizes the display image reflected by the windshield 101 as the virtual image 110. For the driver 200, the virtual image 110 is recognized in front of the windshield 101. The vehicular display device 1 is configured to include a housing 2, a display 3, a transparent cover 5, a quarter wave plate 6, and two reflecting mirrors 7 and 9.

Unless otherwise noted, in this specification, the "forward-rearward direction" indicates the forward-rearward direction of the vehicle 100 equipped with the vehicular display device 1. Unless otherwise noted, the "upward-downward direction" indicates the upward-downward direction of the vehicle 100 and the "width direction" indicates the vehicle width direction of the vehicle 100.

The housing 2 has an inner portion formed in a hollow box shape and an internal space accommodating the display 3, the reflecting mirror 7, and so on. The housing 2 has an opening 2a, which is a part of the optical path of the display light that is emitted toward the windshield 101. The opening 2a is located at a position facing the windshield 101 and allows the display light to pass toward the windshield 101. The housing 2 has a light shielding wall 2b erected in the front edge portion of the opening 2a in the forward-rearward direction. The light shielding wall 2b protrudes upward in the upward-downward direction and is formed to extend along the width direction. Specifically, the light shielding wall 2b protrudes upward from the front edge portion of the transparent cover 5 in the forward-rearward direction and is formed to extend along the lateral direction of the transparent cover 5. The light shielding wall 2b shields external light SL in the front of the transparent cover 5 in the forward-rearward direction and prevents reflection of the external light SL by the transparent cover 5. The external light SL is, for example, sunlight or street lamp light incident upon the inside of the vehicle from the outside of the vehicle 100.

The display 3 emits a display image projected onto the windshield 101 of the vehicle 100 as display light. The display 3 is configured to include, for example, a liquid crystal panel (not illustrated) and a backlight unit (not illustrated). The liquid crystal panel is made of, for example, a light-transmissive or semi-light-transmissive thin film transistor (TFT) liquid crystal display. When the liquid crystal panel is illuminated from the back surface side of the liquid crystal panel, the display surface on the surface side of the liquid crystal panel emits light. The backlight unit illuminates the liquid crystal panel from the back surface side. The backlight unit is driven by, for example, electric power obtained from a battery (not illustrated) in the vehicle 100. As illustrated in FIG. 2, the display 3 of the present embodiment emits linearly polarized light vibrating in a reference vibration direction as display light L1. Here, the reference vibration direction is, for example, a vertical direction and a direction parallel to the polarizing axis of the display 3. In other words, the display 3 has a polarizing axis in the vertical direction and emits the display light L1 parallel to the polarizing axis. For example, the display 3 is disposed such that the polarizing axis (transmission axis) of one of the polarizing plates that constitute the liquid crystal panel, which is on the light emitting side, is in the vertical direction.

The transparent cover 5 is a cover member that blocks the opening 2a provided in the housing 2 and transmits at least a part of the display light emitted from the display 3. By blocking the opening 2a, the transparent cover 5 prevents dust and the like from entering the housing 2 from the outside. The transparent cover 5 is made of a light-transmitting member transmitting the display light emitted from the display 3, examples of which include a synthetic resin such as polycarbonate and acrylic resin, and glass, and a polarizing member combined with the member. The polarizing member includes, for example, a polarizing film. The polarizing film is affixed to a convex curved surface 5a side of the transparent cover 5 and combined with the light-transmitting member. The polarizing member typically has a polarizing axis, transmits light vibrating in parallel with the polarizing axis, and reflects light vibrating in a direction orthogonal to the polarizing axis. In other words, as illustrated in FIG. 2, the transparent cover 5 has a polarizing axis in the horizontal direction orthogonal to the vertical direction, transmits display light L3 vibrating in a direction parallel to the polarizing axis (direction orthogonal to the reference vibration direction), and reflects the display light L1 vibrating in a direction orthogonal to the polarizing axis (reference vibration direction). The transparent cover 5 of the present embodiment is configured to reflect the display light emitted from the display 3 toward the quarter wave plate 6 and transmit the display light reflected from the reflecting mirror 7 toward the windshield 101.

The transparent cover 5 has the shape of a convex curved surface protruding toward the inside of the housing 2. The transparent cover 5 has the convex curved surface 5a protruding toward the inside of the housing 2 and a concave curved surface 5b provided on the surface on the side opposite to the convex curved surface 5a and concave outward from the housing 2. The convex curved surface 5a and the concave curved surface 5b are configured by means of, for example, an aspherical surface (including a free-form surface). The convex curved surface 5a of the present embodiment has a shape correcting a field curvature aberration resulting from the effect of at least one of a curved surface in an optical system such as the reflecting mirror 7 (including a reflecting surface and a transmission surface) and the surface shape of the windshield 101 of the vehicle 100. The concave curved surface 5b of the present embodiment has a function as a reflecting mirror that reflects the external light SL incident upon the transparent cover 5 from the outside of the vehicle 100. In other words, the concave curved surface 5b reflects the external light SL incident upon the transparent cover 5 toward a direction different from the eye point direction toward the eye point 201 of the driver 200. For example, the concave curved surface 5b reflects the incident external light SL toward the light shielding wall 2b. Here, the external light SL is, for example, sunlight or street lamp light incident upon the inside of the vehicle from the outside of the vehicle 100. The thickness between the convex curved surface 5a and the concave curved surface 5b, that is, the thickness of the transparent cover 5 is preferably increased in view of strength. In a case where the thickness is increased, however, the back surface reflection of the convex curved surface 5a and the concave curved surface 5b may significantly affect the display image. Accordingly, the thickness is preferably a thickness taking the possibility into account.

The quarter wave plate 6 is disposed at a position that is on the optical path of the display light from the display 3 to the windshield 101 and faces the reflecting mirror 9. The quarter wave plate 6 transmits the display light incident from the transparent cover 5 and transmits the display light incident from the reflecting mirror 9. The quarter wave plate 6 is a type of so-called wave plate, and a birefringent material or the like constitutes the quarter wave plate 6. The quarter wave plate 6 is obtained by giving a phase difference (optical path difference) to two linearly polarized light beams that have vibration directions orthogonal to each other. The quarter wave plate 6 of the present embodiment converts the display light L1 incident from the transparent cover 5 and transmitted to the reflecting mirror 9 side into display light L2a (circularly polarized light) vibrating in a direction tilted by 45° (degree) with respect to the reference vibration direction. In other words, as illustrated in FIG. 2, the quarter wave plate 6 converts the linearly polarized light (display light L1) reflected by the convex curved surface 5a of the transparent cover 5 into circularly polarized light (display light L2a) that is counterclockwise and tilted by 45°. In addition, the quarter wave plate 6 converts display light L2b reflected by the reflecting mirror 9 and transmitted toward the reflecting mirror 7 into the display light L3 (second linearly polarized light) vibrating in a direction orthogonal to the reference vibration direction. In other words, as illustrated in FIG. 2, the quarter wave plate 6 converts the circularly polarized light (display light L2b) reflected by the reflecting surface of the reflecting mirror 9 into linearly polarized light (display light L3) orthogonal to the reference vibration direction. In this manner, the quarter wave plate 6 converts transmitted linearly polarized light into circularly polarized light and converts transmitted circularly polarized light into linearly polarized light. Here, the display light L2b is circularly polarized light whose rotation direction is opposite to that of the circularly polarized light which is the display light L2a. In other words, once reflected by the reflecting mirror 9, the display light L2a is converted into the circularly polarized display light L2b rotating in the opposite direction.

The reflecting mirrors 7 and 9 are located at positions where the optical path of the display light from the display 3 to the windshield 101 is folded back and reflect the display light. The reflecting mirrors 7 and 9 are optical systems that change the optical path of the display light emitted from the display 3 in the housing 2. The reflecting mirrors 7 and 9 of the present embodiment have a function as the magnifying mirror described above. The reflecting mirrors 7 and 9 are formed of, for example, a concave curved surface (or a convex curved surface) having an aspherical reflecting surface. In other words, the reflecting mirrors 7 and 9 magnify and reflect the display image such that the display image represented by the display light after reflection by the reflecting mirrors 7 and 9 becomes relatively larger than the display image represented by the display light before reflection by the reflecting mirrors 7 and 9. The reflecting mirror 9 of the present embodiment is an intermediate bending mirror that totally reflects the display light reflected by the transparent cover 5 and transmitted through the quarter wave plate 6 again toward the reflecting mirror 7 by transmission through the quarter wave plate 6. The reflecting mirror 7 of the present embodiment is a final reflecting mirror that totally reflects the display light incident through the quarter wave plate 6 toward the windshield 101 disposed on the opposite side with the transparent cover 5 interposed between the reflecting mirror 7 and the windshield 101. Although the reflecting mirror 7 is fixedly supported by the housing 2, the reflecting mirror 7 may be supported by an adjustment mechanism for finely adjusting the reflection angle of display light with which the windshield 101 is irradiated.

Next, a display operation of the vehicular display device 1 will be described with reference to FIG. 1. First, the display light emitted from the display 3 is directed to the transparent cover 5. The transparent cover 5 reflects the display light incident from the display 3 toward the quarter wave plate 6 by the convex curved surface 5a. The quarter wave plate 6 transmits the display light incident from the transparent cover 5 toward the reflecting mirror 9. The display light incident upon the reflecting mirror 9 is totally reflected by the concave reflecting surface and directed to the quarter wave plate 6. The quarter wave plate 6 transmits the display light incident from the reflecting mirror 9 toward the reflecting mirror 7. The display light incident upon the reflecting mirror 7 is totally reflected by the concave reflecting surface and directed to the transparent cover 5 again. The transparent cover 5 transmits the display light incident from the reflecting mirror 7 from the convex curved surface 5a toward the windshield 101 via the concave curved surface 5b. As a result, the display image is projected onto the windshield 101 and the virtual image 110 is displayed in front of the eye point 201 of the driver 200.

In the vehicular display device 1 described above, the transparent cover 5 has a polarization structure to transmit the second linearly polarized light converted from first linearly polarized light toward the windshield 101 by reflecting the first linearly polarized light emitted from the display 3 and transmitting the first linearly polarized light by folding back the quarter wave plate 6. By the transparent cover 5 being given a function as a polarizing plate and the display light being reflected on the transparent cover 5 in this manner, it is possible to extend the optical path length of the display light, and it is possible to magnify a display screen by magnifying the display image representing the display light with the lengthened optical path length. In addition, the housing 2 can be reduced in size as it is possible to extend the optical path length of the display light without adding any new optical system component. In addition, far-viewpoint display of the display image is facilitated based on the extension of the optical path length of the display light. Further, the transparent cover 5 reflects (or absorbs) the linearly polarized light that constitutes the external light SL and vibrates in the reference vibration direction, and thus the external light SL that reaches the display 3 via the reflecting mirrors 7 and 9 or the like decreases and a rise in the temperature of the display 3 attributable to incidence of the external light SL can be suppressed.

In addition, in the vehicular display device 1, the transparent cover 5 has the concave curved surface 5b that is tilted forward, and thus the linearly polarized light that constitutes the external light SL and vibrates in the reference vibration direction can be reflected toward the light shielding wall 2b and collected.

In addition, in the vehicular display device 1, the transparent cover 5 is configured by combination of a light-transmitting member and a polarizing film, and thus product manufacturing can be facilitated and an increase in cost can be suppressed.

Incidentally, in the embodiment described above, the transparent cover 5 has a shape in which the convex curved surface 5a corrects a field curvature aberration. For example, the convex curved surface 5a is formed in a shape corresponding to the shape of the projected surface of the windshield 101 and the geometrical positional relationship of the reflecting mirror 7 with respect to the projected surface and optically corrects distortion such that the display image represented by the display light has a desired shape when the display light is reflected toward the windshield 101. As a result, it is possible to correct display distortion of the display image represented by the display light by display light reflection on the convex curved surface 5a of the transparent cover 5, and display quality improvement can be achieved.

In addition, in the embodiment described above, the transparent cover 5 has a polarization function by a polarizing film being affixed to the convex curved surface 5a side. However, the present embodiment is not limited thereto, and the transparent cover 5 may have a polarization function by a deflection film being affixed to the concave curved surface 5b side. In addition, the transparent cover 5 may be a cover integrally molded with a light-transmitting member and a polarizing plate.

In addition, in the embodiment described above, the light shielding wall 2b is provided on the housing 2 side. However, the present embodiment is not limited thereto, and the light shielding wall 2b may be formed on the transparent cover 5 side. In other words, in the transparent cover 5, the light shielding wall 2b is formed to protrude to the upper part of the vehicle 100 in the upward-downward direction from the front edge portion of the vehicle 100 in the forward-rearward direction and extend along the width direction crossing the forward-rearward direction and the upward-downward direction.

In addition, in the embodiment described above, the vehicular display device 1 has the two reflecting mirrors 7 and 9. However, the present embodiment is not limited thereto, and the vehicular display device 1 may have three or more reflecting mirrors instead.

In addition, in the embodiment described above, the reflecting mirrors 7 and 9 have a function as a magnifying mirror. However, the present embodiment is not limited thereto, and the reflecting mirrors 7 and 9 may also have a function as the above-described correction mirror. The reflecting mirrors 7 and 9 that function as the magnifying mirror and the correction mirror are formed as free-form surface mirrors having shapes asymmetrical with respect to an optical axis unlike a spherical surface and a paraboloidal surface.

In addition, in the embodiment described above, the display image is projected onto the windshield 101 of the vehicle 100. However, the present embodiment is not limited thereto, and the display image may be projected onto a combiner or the like instead.

In addition, in the embodiment described above, a case where the vehicular display device 1 is applied to the vehicle 100 has been described. However, the present embodiment is not limited thereto. The present embodiment may also be applied to those other than the vehicle 100, examples of which include ships and aircrafts.

With the vehicular display device according to the present embodiment, the display screen can be expanded and the housing can be reduced in size.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicular display device comprising:
   a display that emits, as display light, a display image projected onto a projected member provided in a vehicle;
   a cover member that blocks an opening provided in a housing and transmits the display light emitted from the display;
   a first aspherical mirror that is located at a position where an optical path of the display light from the display to the projected member is folded back, and reflects the display light;
   a quarter wave plate that is disposed at a position facing the first aspherical mirror on the optical path of the display light, transmits the display light incident from the cover member, and transmits the display light incident from the first aspherical mirror; and
   a second aspherical mirror that reflects the display light transmitted through the quarter wave plate toward the projected member disposed on an opposite side with respect to the cover member that is interposed between the second aspherical mirror and the projected member, wherein
   the display emits first linearly polarized light vibrating in a reference vibration direction,
   the quarter wave plate converts the first linearly polarized light incident from the cover member and transmitted to the first aspherical mirror side into circularly polarized light vibrating in a direction tilted by 45 degree with respect to the reference vibration direction, and converts the circularly polarized light reflected by the first aspherical mirror and transmitted toward the second aspherical mirror into second linearly polarized light vibrating in a direction orthogonal to the reference vibration direction, and
   the cover member has a convex curved surface shape protruding toward an inside of the housing, and has a structure to reflect the first linearly polarized light emitted from the display toward the quarter wave plate and transmit the second linearly polarized light from the second aspherical mirror toward the projected member.

* * * * *